US009664901B2

United States Patent
Chen et al.

(10) Patent No.: US 9,664,901 B2
(45) Date of Patent: May 30, 2017

(54) COLLIMATION ASSEMBLY FOR AN IMAGING DEVICE

(71) Applicant: Lexmark International, Inc., Lexington, KY (US)

(72) Inventors: Fei Chen, Lexington, KY (US); Randall Lee Hudson, Lexington, KY (US); Christopher Dane Jones, Georgetown, KY (US); Jason Lee Rowe, Richmond, KY (US)

(73) Assignee: LEXMARK INTERNATIONAL, INC., Lexington, MA (US)

( * ) Notice: Subject to any disclaimer, the term of this patent is extended or adjusted under 35 U.S.C. 154(b) by 0 days.

(21) Appl. No.: 14/869,155

(22) Filed: Sep. 29, 2015

(65) Prior Publication Data

US 2017/0090188 A1    Mar. 30, 2017

(51) Int. Cl.
G02B 26/08 (2006.01)
G02B 26/12 (2006.01)
G02B 27/30 (2006.01)
G02B 7/02 (2006.01)

(52) U.S. Cl.
CPC ........... *G02B 26/124* (2013.01); *G02B 7/021* (2013.01); *G02B 26/123* (2013.01); *G02B 26/125* (2013.01); *G02B 27/30* (2013.01)

(58) Field of Classification Search
CPC .. G02B 26/123; G02B 26/124; G02B 26/125; G02B 19/0052; G02B 27/0955; B41J 2/473; H01S 5/02288
USPC ............................... 359/204.1, 207.1, 216.1
See application file for complete search history.

(56) References Cited

U.S. PATENT DOCUMENTS 6,950,216 B2 * 9/2005 Kaneko .................... B41J 2/473
359/204.1

* cited by examiner

*Primary Examiner* — Euncha Cherry

(57) ABSTRACT

A collimation assembly includes a body, at least four light sources, and at least four collimation lenses. The body has inner surfaces that define at least four hollow portions extending through the body between opposed first and second sides thereof, each hollow portion having opposed first and second openings at the first and second sides of the body, respectively. Each light source is disposed at the first opening of one of the at least four hollow portions and controllable to emit a light beam therethrough. Each collimation lens is disposed at the second opening of one of the at least four hollow portions to receive the light beam emitted by the light source disposed at the first opening and diverge the light beam as the light beam passes through the collimation lens. The at least four light sources and the at least four collimation lenses are supported by the body.

21 Claims, 8 Drawing Sheets

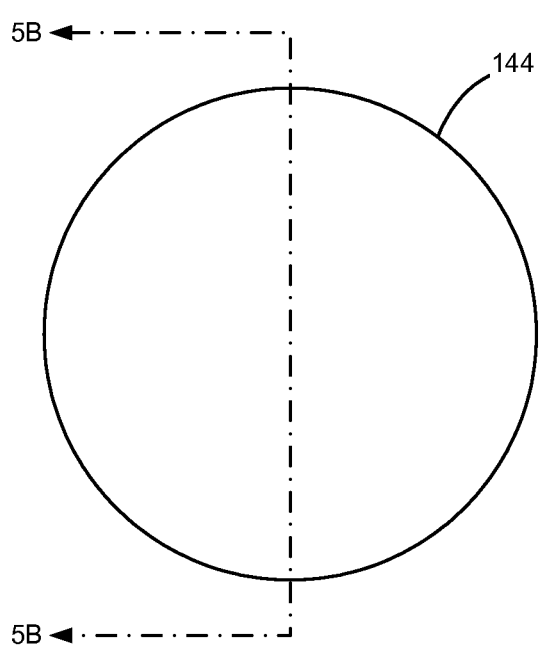
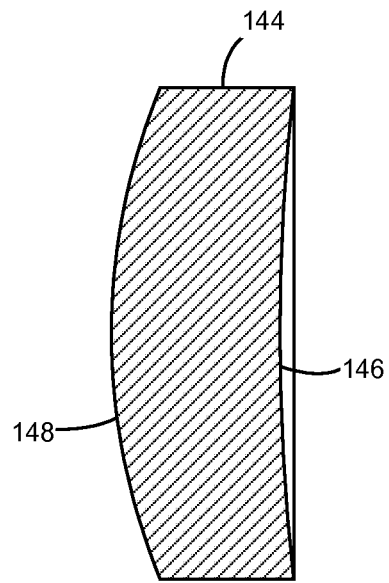
Fig. 5A            Fig. 5B
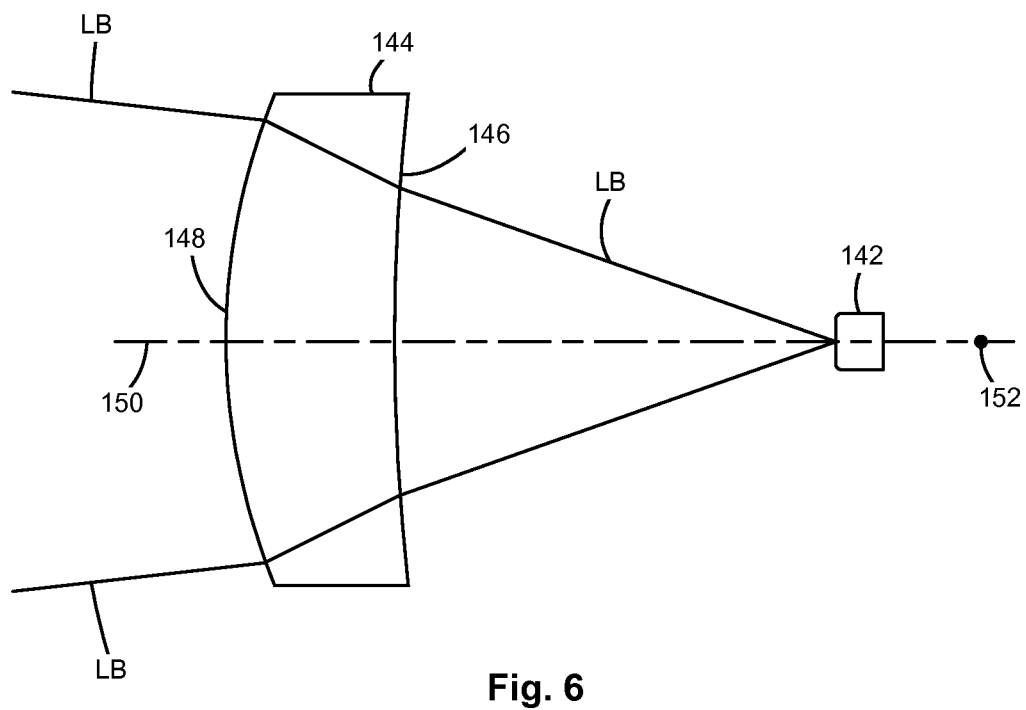
Fig. 6

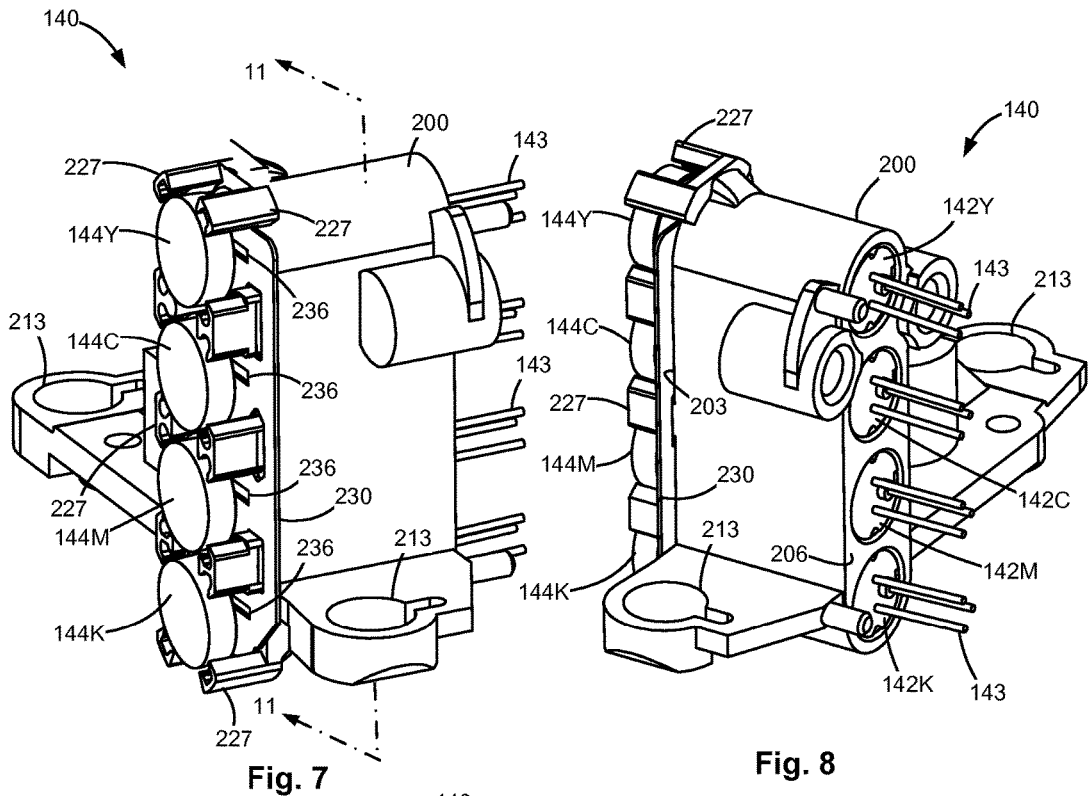
Fig. 7
Fig. 8
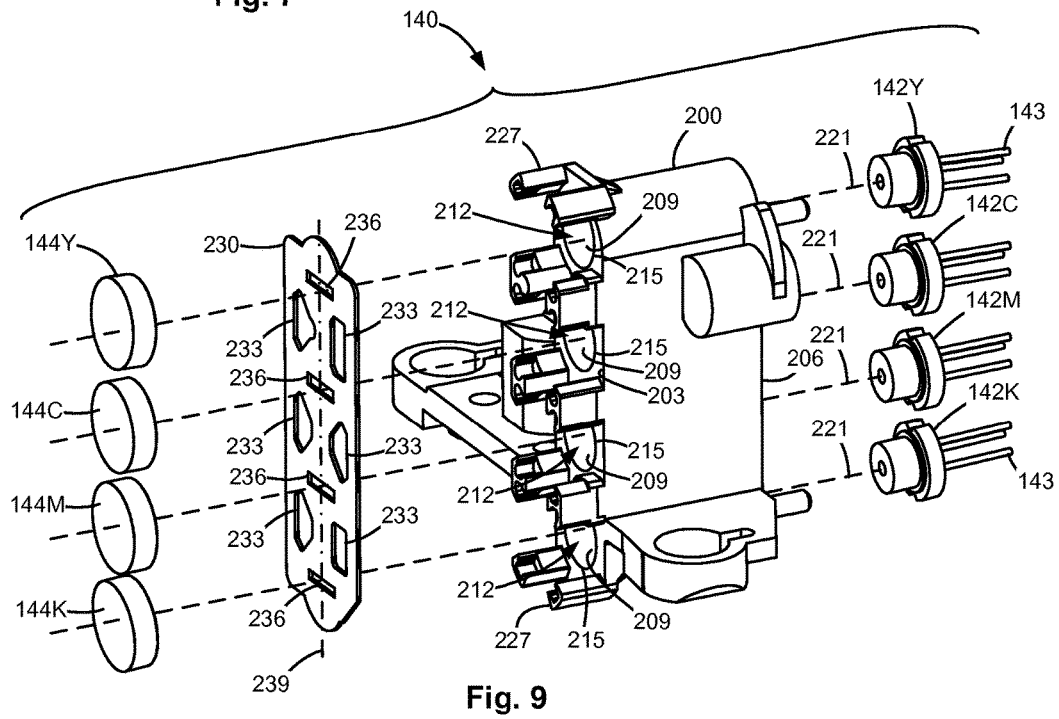
Fig. 9

COLLIMATION ASSEMBLY FOR AN IMAGING DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The present disclosure relates generally to an optical scanning system in an imaging apparatus, and more particularly to a compact collimation assembly incorporating multiple light sources and collimation lenses for use in over-filled scanner (OFS) scanning system.

2. Description of the Related Art

In various imaging devices which utilize light to form images, optical scanning systems are typically incorporated to scan light beams from one or more light sources onto a target image plane surface. In an electrophotographic imaging device, for example, the image plane surface is typically a photosensitive member. Generally, light beams are swept across the image plane surface by a scanning mirror to form light spots upon the image plane surface along a scan line direction. Commonly used scanning mirrors include rotating polygon mirrors which scan light beams in one direction.

A polygon mirror can have either an under-filled or over-filled facet design. In an under-filled design, the facet length is significantly wider than the incident light beam width such that the beam footprint on a facet never crosses over the edges of the facet from start to end of a scan line operation. On the other hand, an over-filled design has a facet length that is narrower than the incident light beam such that the beam footprint on a facet completely fills the facet and extends beyond its edges over the duration of a scan line operation. In this case, the width of the laser beam after it is reflected by the polygon mirror is determined by the size of the polygon facet.

Generally, in order to have a decent optical performance particularly on laser spot size, the width of a light beam striking a polygon facet must be at least some requisite value, such as 4 mm. By comparison, for a given number of polygon facets, the under-filled design would require a larger polygon diameter since size of a facet would have to be wider than the requisite beam width, while the over-filled design would require a smaller polygon diameter since length of a facet only needs to be at least the same as the requisite beam width. Thus, scanning systems that employ polygon mirrors with larger number of facets can be implemented at lower costs using the overfilled design. In addition, polygon mirrors having smaller diameters are not only significantly less expensive, but also run faster, have less acoustic noise and contamination on the polygon facets, and allows faster time to first print.

In color imaging systems, one of the challenges of having an over-filled facet design is to achieve a sufficiently wide incoming beam with relatively small wavefront error for good beam quality for all four color channels. In some existing approaches, beam expanding optic sets have been used to expand laser beams along a scan direction. As an example, FIGS. 1A-1B illustrate an optical layout of a known scanning system 10 employing an over-filled polygon facet design. FIG. 1A is top view of the optical layout of scanning system 10 and FIG. 1B is a side view thereof. It is noted that prescan mirrors have been removed in FIG. 1B to more clearly illustrate the tracing of beams. Four light beams 15 from four light sources 20, each for a different color channel, are collimated through four collimation lenses 25 so that each light beam 15 propagates with a constant beam shape and size. After passing through collimation lenses 25, the four light beams 15 are received by respective prescan mirrors 30 and combined to share the same downstream prescan optics before reaching a polygon mirror 35, as shown in FIG. 1A, while remaining separated along the cross-scan direction 40 as shown in FIG. 1B. The downstream prescan optics include four prescan lenses 45A-45D, and two additional prescan mirrors 50A, 50B. First prescan lens 45A and third prescan lens 45C are cylindrical lenses with optical power along the cross-scan axis to converge the four light beams 15 along the cross scan direction 40. In order to expand each light beam 15 after collimation lenses 25, second prescan lens 45B typically has a spherical concave surface so as to diverge each light beam 15 along a scan direction perpendicular to the cross-scan direction 40. Meanwhile, fourth prescan lens 45D is a cylindrical lens with optical power along the scan axis so as to collimate and slightly converge each light beam 15 along the scan direction. Accordingly, each light beam 15 arrives at polygon mirror 35 with a sufficient beam width that overfills a facet of polygon mirror 35 as shown in FIG. 1A.

However, in the example design illustrated in FIGS. 1A-1B, the optical layout includes a relatively large number of optical components which presents added complexity and cost to the scanning system 10. Moreover, the design requiring six prescan mirrors 30, 50 and four prescan lenses 45A-45D before the light beam reaches the polygon mirror 35 reduces robustness of the scanning system. This is because optical performance of a scanning system is generally very sensitive to alignment of the optics upstream of the scanning mirror. By having a larger number of optical components before the scanning mirror, additional accumulated tolerances are introduced on the optical path which makes it difficult to have precise optical alignment. Additionally, in order to maintain alignment accuracy, most of the prescan mirrors 30, 50 have mechanical features to allow for tilt angle adjustments along both scan and cross-scan directions which may not only add more cost but also reduce the overall system robustness.

SUMMARY

Example embodiments of the present disclosure provide an over-filled type scanning system that utilizes a collimation assembly which improves robustness and cost efficiency. In one example embodiment, the collimation assembly includes a body, at least four light sources, and at least four collimation lenses. The body has inner surfaces that define at least four hollow portions extending through the body between opposed first and second sides thereof, each hollow portion having opposed first and second openings at the first and second sides of the body, respectively. Each light source is disposed at the first opening of one of the at least four hollow portions and controllable to emit a light beam therethrough. Each collimation lens is disposed at the second opening of one of the at least four hollow portions to receive the light beam emitted by the light source disposed at the first opening and diverge the light beam as the light beam passes through the collimation lens. The at least four light sources and the at least four collimation lenses are supported by the body.

In another example embodiment, a scanning system includes a housing, a scanning member disposed within the housing and having a plurality of reflective surfaces, and a collimation assembly disposed within the housing. The collimation assembly includes a body having inner surfaces that define a first, a second, a third, and a fourth hollow portion extending through the body between opposed first and second sides thereof, each hollow portion having opposed first and second openings at the first and second sides of the body, respectively. A first light source, a second light source, a third light source, and a fourth light source are positioned at the first openings of the first, second, third, and fourth hollow portions, respectively, the first, second, third, and fourth light sources and controllable to emit first, second, third, and fourth light beams, respectively. A first, a second, a third, and a fourth collimation lens are disposed at the second openings of the first, second, third, and fourth hollow portions, respectively, the first, second, third, and fourth collimation lens for receiving the light beams emitted by the first, second, third, and fourth light sources, respectively, and diverging the light beams so as to be incident on at least two reflective surfaces of the scanning member upon arriving thereat.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings, wherein:

FIGS. 5A and 5B are a front view and a side cross-sectional view, respectively, with the side cross-section view taken along lines 5B-5B of FIG. 5A, illustrating a profile of a collimation lens in the collimation assembly of FIG. 3, according to an example embodiment.

FIG. 6 is a schematic diagram illustrating relative positions of the collimating lens and a light source of the collimation assembly of FIG. 3, according to an example embodiment.

FIG. 7 is a side perspective view of the collimation assembly in FIG. 3 showing a front side thereof.

FIG. 8 is a side perspective view of the collimation assembly showing a rear side thereof.

FIG. 9 is an exploded perspective view of the collimation assembly in FIG. 7.

DETAILED DESCRIPTION

Figure 1A:
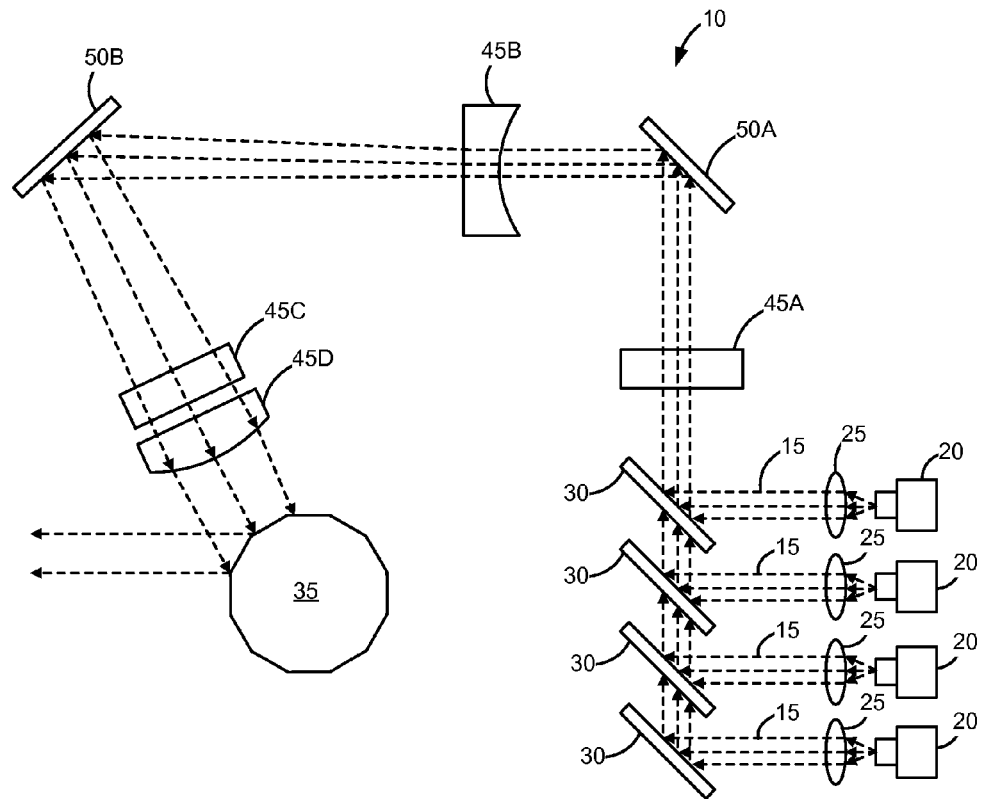
FIGS. 1A and 1B illustrate top and side views, respectively, of a prior art optical layout of a scanning system.
Figure 1B:
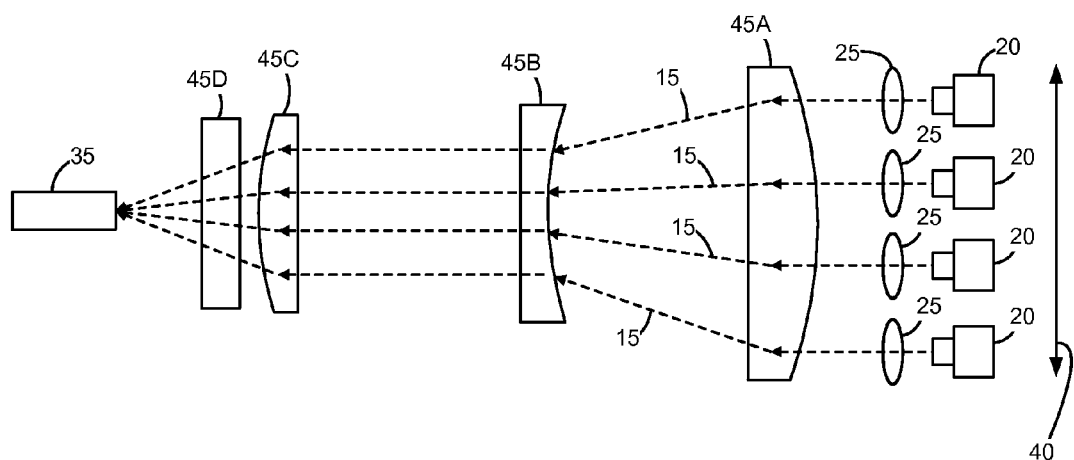

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", "above", "under", "below", "lower", "over", "upper", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

Figure 2:
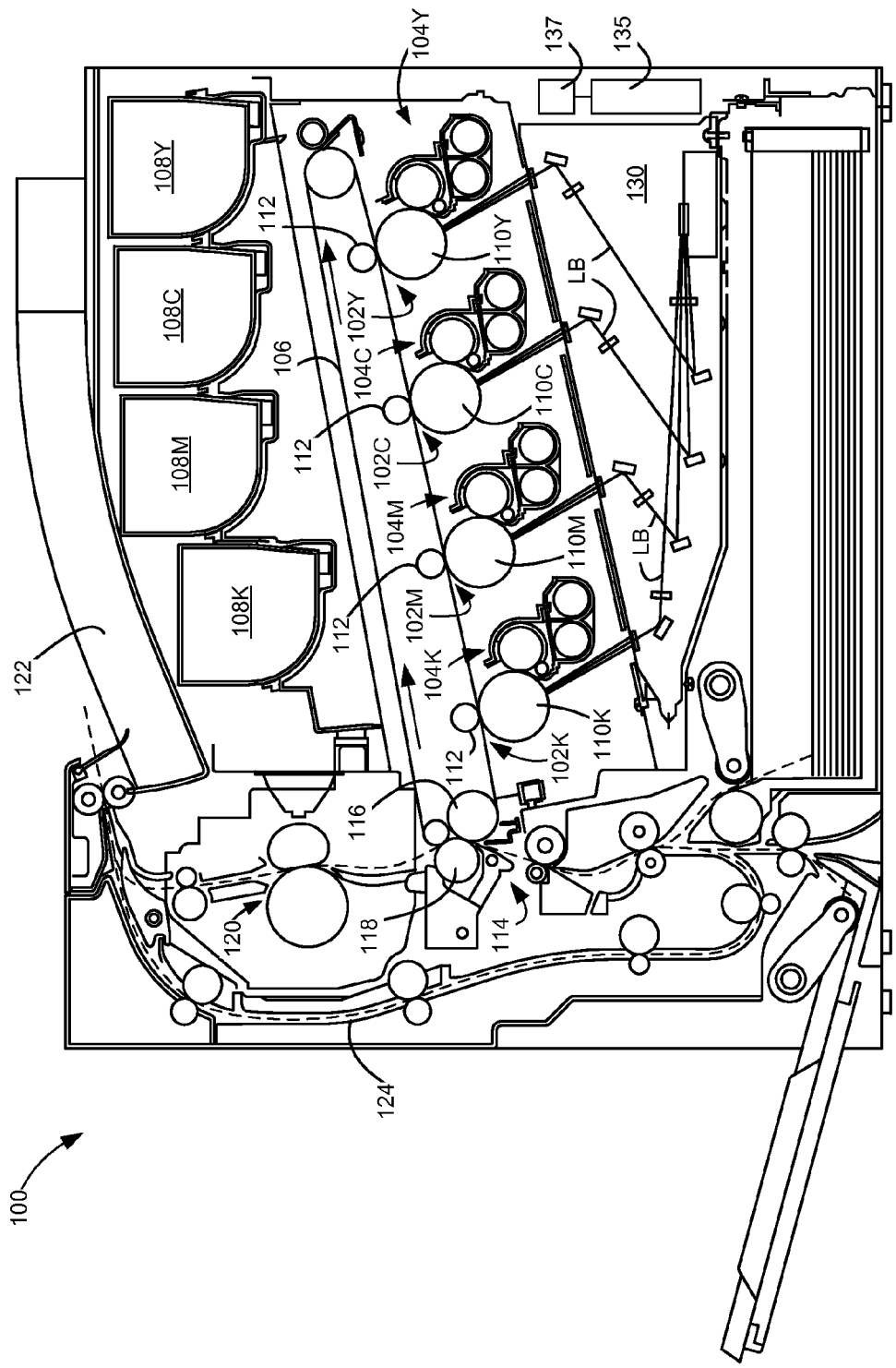
FIG. 2 is a side elevational view of an image forming device according to an example embodiment.

FIG. 2 illustrates a color image forming device 100 according to an example embodiment. Image forming device 100 includes a first toner transfer area 102 having four developer units 104 that substantially extend from one end of image forming device 100 to an opposed end thereof. Developer units 104 are disposed along an intermediate transfer member (ITM) 106. Each developer unit 104 holds a different color toner. The developer units 104 may be aligned in order relative to the direction of the ITM 106 indicated by the arrows in FIG. 2, with the yellow developer unit 104Y being the most upstream, followed by cyan developer unit 104C, magenta developer unit 104M, and black developer unit 104K being the most downstream along ITM 106.

Each developer unit 104 is operably connected to a toner reservoir 108 for receiving toner for use in a printing operation. Each toner reservoir 108 is controlled to supply toner as needed to its corresponding developer unit 104. Each developer unit 104 is associated with a photoconductive member 110 that receives toner therefrom during toner development to form a toned image thereon. Each photoconductive member 110 is paired with a transfer member 112 for use in transferring toner to ITM 106 at first transfer area 102.

During color image formation, the surface of each photoconductive member 110 is charged to a specified voltage, such as −800 volts, for example. At least one laser beam LB from a printhead or laser scanning unit (LSU) 130 is directed to the surface of each photoconductive member 110 and discharges those areas it contacts to form a latent image thereon. In one embodiment, areas on the photoconductive member 110 illuminated by the laser beam LB are discharged to approximately −100 volts. The developer unit 104 then transfers toner to photoconductive member 110 to form a toner image thereon. The toner is attracted to the areas of the surface of photoconductive member 110 that are discharged by the laser beam LB from LSU 130.

ITM 106 is disposed adjacent to each of developer unit 104. In this embodiment, ITM 106 is formed as an endless belt disposed about a drive roller and other rollers. During image forming operations, ITM 106 moves past photoconductive members 110 in a clockwise direction as viewed in FIG. 2. One or more of photoconductive members 110 applies its toner image in its respective color to ITM 106. For mono-color images, a toner image is applied from a single photoconductive member 110K. For multi-color images, toner images are applied from two or more photoconductive members 110. In one embodiment, a positive voltage field formed in part by transfer member 112 attracts the toner image from the associated photoconductive member 110 to the surface of moving ITM 106.

ITM 106 rotates and collects the one or more toner images from the one or more developer units 104 and then conveys the one or more toner images to a media sheet at a second transfer area 114. Second transfer area 114 includes a second transfer nip formed between at least one back-up roller 116 and a second transfer roller 118.

Fuser assembly 120 is disposed downstream of second transfer area 114 and receives media sheets with the unfused toner images superposed thereon. In general terms, fuser assembly 120 applies heat and pressure to the media sheets in order to fuse toner thereto. After leaving fuser assembly 120, a media sheet is either deposited into output media area 122 or enters duplex media path 124 for transport to second transfer area 114 for imaging on a second surface of the media sheet.

Image forming device 100 is depicted in FIG. 2 as a color laser printer in which toner is transferred to a media sheet in a two step operation. Alternatively, image forming device 100 may be a color laser printer in which toner is transferred to a media sheet in a single step process—from photoconductive members 110 directly to a media sheet. Further, image forming device 100 may be part of a multi-function product having, among other things, an image scanner for scanning printed sheets.

Image forming device 100 further includes a controller 135 and memory 137 communicatively coupled thereto. Though not shown in FIG. 2, controller 135 may be coupled to components and modules in image forming device 100 for controlling same. For instance, controller 135 may be coupled to toner reservoirs 108, developer units 104, photoconductive members 110, fuser 120 and/or LSU 130 as well as to motors (not shown) for imparting motion thereto. It is understood that controller 135 may be implemented as any number of controllers and/or processors for suitably controlling image forming device 100 to perform, among other functions, printing operations.

Figure 3:
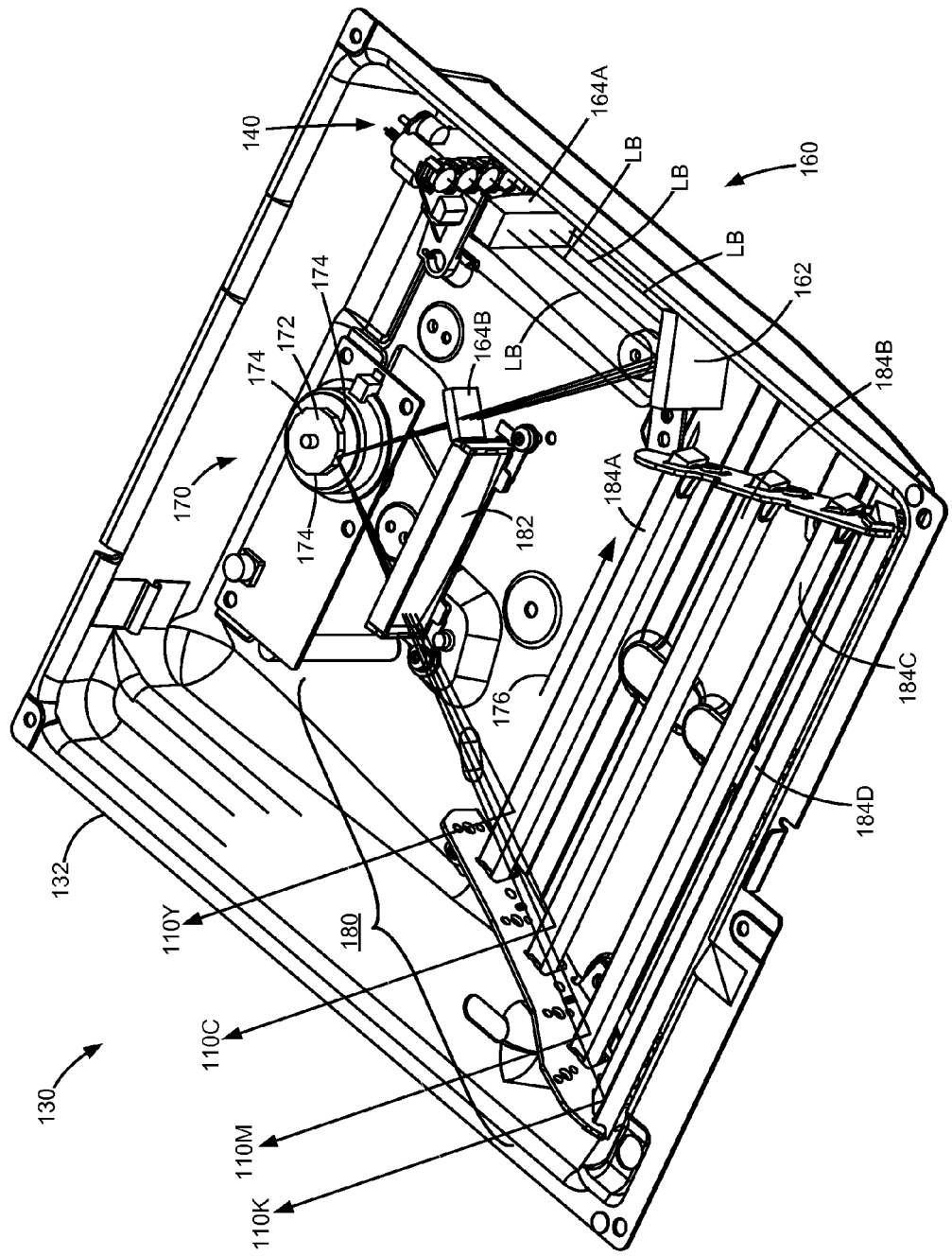
FIG. 3 illustrates a laser scanning unit of the image forming device in FIG. 2 including a collimation assembly according to an example embodiment.

Referring now to FIG. 3, a perspective view of LSU 130 is shown according to an example embodiment of the present disclosure. LSU 130 includes a collimation assembly 140, pre-scan optics 160, scanning device 170, and post-scan optics 180 disposed within a housing 132.

Collimation assembly 140 is generally used to generate light beams for use in forming a latent image on the surface of photoconductive members 110. In one example embodiment, collimation assembly 140 combines multiple light sources and multiple collimation lenses into one single unit, as will be discussed in greater detail below. In the example shown, four light beams LB are generated each corresponding to one of the cyan, magenta, yellow, and black color image planes. LSU 130 may also include driver circuitry (not shown) communicatively coupled to controller 135 for receiving video/image information and/or control data that may be utilized to set and/or vary the laser power used by each light source of collimation assembly 140 in order to modulate light beams LB.

Pre-scan optics 160 includes a prescan mirror 162 that directs light beams LB from collimation assembly 140 to scanning device 170, and prescan lenses 164A, 164B which focus the modulated light beams LB into scanning device 170. Prescan lens 164A is disposed along the optical paths of light beams LB between collimation assembly 140 and prescan mirror 162, while prescan lens 164B is disposed along the optical paths of light beams LB between prescan mirror 162 and scanning device 170. In one example embodiment, prescan lenses 164A, 164B may be adhesively mounted within LSU 130 with a precision fixture and without the need of additional metal clips and mounting hardware providing manual positional adjustment.

Scanning device 170 includes a polygon mirror 172 having a plurality of reflective surfaces or facets 174 for receiving and reflecting light incident thereon. In the example shown, polygon mirror 172 is a 12-facet polygon. Polygon mirror 172 is controllable by controller 135 using a motor (not shown) to rotate at a rotational velocity during an imaging operation so as to unidirectionally scan at least portions of laser beams LB in a scan direction 176 to create scan lines on respective photoconductive members 110 in a forward direction. As used herein, "scan direction" or "scan axis" refers to a direction across an optical component that is traversed by a light beam. In some cases, the scan direction may correspond to a direction along the length of an optical component. On the other hand, "cross-scan direction" or "cross-scan axis" refers to a direction along the optical component that is perpendicular to the scan direction. The cross-scan direction may, in some cases, correspond to a direction along the height of an optical component.

Post-scan optics 180 includes a post-scan lens 182 used to focus the light beams LB and a plurality of mirrors 184A-184D used to direct each modulated light beam LB to its corresponding photoconductive member 110. Although FIG. 3 illustrates the use of a single post-scan lens 182, it will be appreciated that more than one post-scan lens may be used to focus light beams LB deflected by scanning device 170 into small and uniform spot sizes on the surface of photoconductive members 110. For example, four post-can lenses, such as F2 lenses (not shown), may each be disposed downstream of respective mirrors 184A-184D at an exit window (not shown) of housing 132 to aid in focusing light beam LB on the surface of its corresponding photoconductive member 110.

During an imaging operation, image data corresponding to an image to be printed is converted by controller 135 into laser modulation data. The laser modulation data is utilized by the driver circuitry so that LSU 130 outputs modulated laser beams LB. According to example embodiments of the present disclosure, LSU 130 utilizes an over-filled polygon facet design. More particularly, each laser beam LB is expanded so as to over-fill a facet 174 of polygon mirror 172 when performing a scan line operation. Thus, the width of the light beams LB upon being incident on polygon mirror 172 is larger than the length of a facet 174 of polygon mirror 172.

Figure 4A:
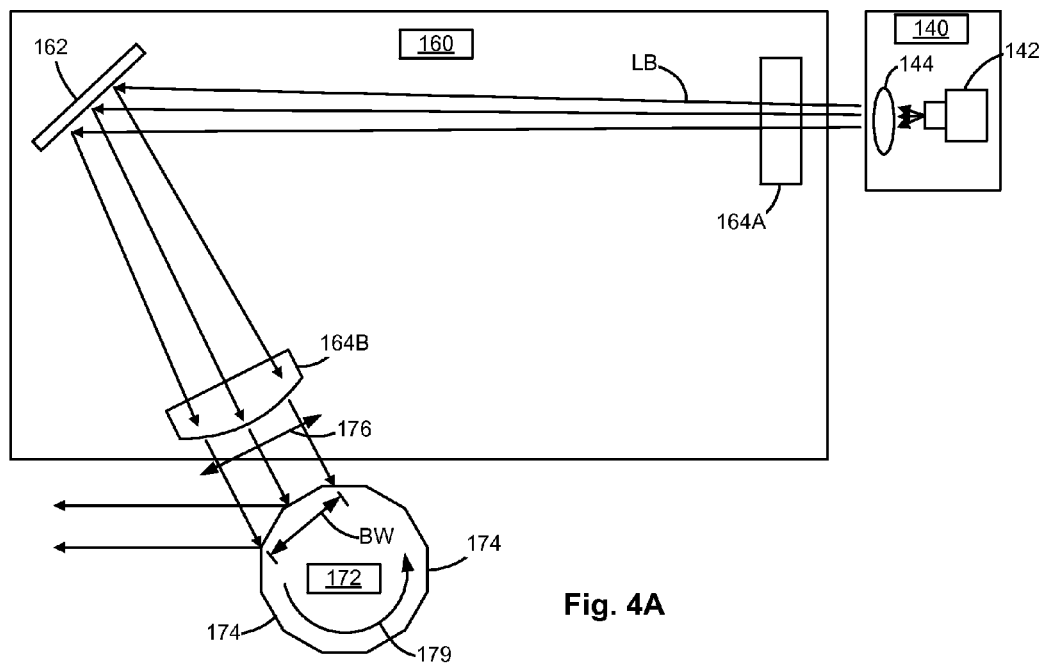
FIGS. 4A and 4B illustrate top and side views, respectively, of an optical layout of the laser scanning unit in FIG. 3 according to an example embodiment.
Figure 4B:
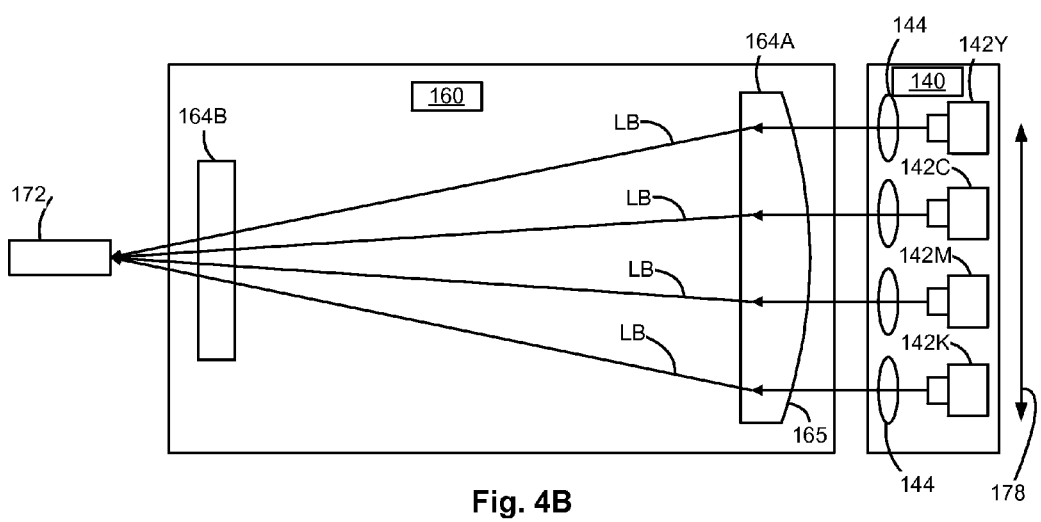

With reference to FIGS. 4A and 4B, top and side optical schematic layouts are illustrated, respectively, showing collimation assembly 140, pre-scan optics 160, and polygon mirror 172 of LSU 130. It is noted that prescan mirror 162 has been omitted in FIG. 4B to more clearly illustrate the beam tracings. Collimation assembly 140 includes light sources 142Y, 142C, 142M, and 142K which emit respective light beams LB, and collimation lenses 144Y, 144C, 144M, and 144K which receive light beams LB emitted by corresponding light sources 142Y, 142C, 142M, and 142K, respectively. According to one example embodiment, light sources 142Y, 142C, 142M, 142K are arranged offset from each other along the cross-scan direction 178 (the cross-scan direction 178 may, alternatively, be seen to be either into or out of the sheet on which FIG. 4A appears). Each light source 142 may be implemented, for example, using a laser diode or any other suitable device for generating a beam of light. In one example embodiment, each collimation lens 144 expands and/or diverges the light beam LB received from light source 142 with a predefined divergence angle instead of collimating the laser beam LB. Prescan lens 164A may be a cylindrical lens with optical power along the cross-scan direction 178 so as to converge all four light beams LB along the cross scan axis into polygon mirror 172, as shown in FIG. 4B. For example, prescan lens 164A may have a light incident surface 165 with a radius of curvature between about 20 mm and about 300 mm. Meanwhile, prescan lens 164B may be a cylindrical lens with optical power along the scan axis so as to converge the laser beams LB along the scan direction 176 into polygon mirror 172, as shown in FIG. 4A. As an example, for each light beam LB, the beam width may be about 5 mm wide along the scan axis immediately after the light beam LB exits collimation lens 144. As the light beam LB continues to diverge after exiting collimation lens 144, the beam width may expand to about 10 mm wide before it passes through prescan lens 164B. Prescan lens 164B may then converge the light beam LB so as to be incident on at least two facets of polygon mirror 172. In FIG. 4A, each light beam LB has a beam width BW that is wide enough to be incident on polygon mirror 172 to completely fill or cover at least two facets 174 of polygon mirror 172.

When polygon mirror 172 rotates in the counter-clockwise direction 179, and as a facet 174 exposed to light beams LB rotates between a start and an end of a scan line operation, the width of each laser beam LB at polygon mirror 172 allows each laser beam LB to cover an entire length of the facet from the start to the end of the scan line operation, thereby deflecting only a portion of each incoming light beam LB towards photoconductive member 110 during the entire scan line operation. Meanwhile, adjacent facet(s) or portions thereof exposed to light beams LB at the same time may direct other portions of laser beam LBs away from photoconductive members 110. After the scan line operation, a subsequent scan line operation may be immediately performed by a subsequent facet in the same manner as the preceding facet. Thus, portions of the light beams LB are always on the facet and there is substantially no inactive scan time corresponding to the time it takes for light beams LB to cross over an edge of a facet to a next facet for a subsequent scan line operation, thereby allowing for duty cycles (ratio of the active scan time on the photoconductive member to the total scan time of a facet) to be very close to 100%.

Because each collimation lens 144 is intentionally designed to diverge the light beam LB passing therethrough, a relatively small diameter may be used for each collimation lens 144 and all four collimation lenses 144 may be stacked relative to each other into one compact unit or assembly, such as collimation assembly 140. In one example embodiment, each collimation lens 144 may have a diameter D between about 5 mm and about 12 mm, such as about 6.5 mm. By stacking all four collimation lenses 144 and combining them with all four light sources 142 into one compact collimation assembly 140, a single prescan mirror 162 can be used to receive and direct all four light beams LB to scanning device 170. Accordingly, the number of prescan mirrors may be reduced to one compared to the example design illustrated in FIG. 1A which requires four different prescan mirrors 30 separately receiving light beams from four collimation lenses 25 and directing the light beams to downstream optical components. Prescan mirror 162 may be mounted on an adjustable mount, with adjustable tilt angles along both scan and cross-scan axes.

In one example embodiment, the profile of each collimation lens 144 may be adjusted so as to intentionally cause laser beam LB to diverge instead of being collimated after passing through collimation lens 144. FIGS. 5A, 5B, and 6 show an example shape and profile of collimation lens 144, in accordance with example embodiments of the present disclosure. FIG. 5A illustrates a front view of collimation lens 144 while FIG. 5B illustrates a side cross-sectional view thereof taken along lines 5B-5B of FIG. 5A. Collimation lenses of this type are the ones disclosed in U.S. patent application Ser. No. 14/140,979, filed Dec. 26, 2013, entitled "Optical Scanning System and Imaging Apparatus for Using Same" and assigned to the assignee of the present application. The content of such patent application is hereby incorporated herein by reference in its entirety.

As shown, collimation lens 144 may include a generally concave light incident surface 146 upon which light beam LB is received from light source 142, and a generally convex light exit surface 148 upon which light beam LB exits collimation lens 144. In an example embodiment, light incident surface 146 may be spherical while light exit surface 148 may be aspheric. The concave shape of the light incident surface 146 and the convex shape of the light exit surface 148 allow collimation lens 144 to intentionally diverge laser beam LB towards polygon mirror 172, instead of collimating light beam LB. In other alternative example embodiments, collimation lens 144 may have a light incident surface that is generally convex or substantially flat or planar that would allow collimation lens 144 to diverge and/or expand laser beams passing therethrough.

In another example embodiment, relative positions between collimation lens 144 and corresponding light source 142 may be adjusted such that the distance between them is less than a focal length of collimation lens 144. FIG. 6 illustrates an example arrangement between light source 142 and collimation lens 144. As shown, collimation lens 144 has an optical axis 150 and a focal point 152 therealong. Normally, positioning light source 142 at focal point 152 would cause laser beam LB emitted by light source 142 to collimate upon exiting collimation lens 144. However, in this example embodiment, light source 142 is arranged along optical axis 150 but offset from the focal point 152 of collimation lens 144 and, more particularly, between collimation lens 144 and its focal point 152. Thus, collimation lens 144 is positioned from light source 142 at a distance less than its focal length so that light beam LB would diverge instead of collimate after exiting light exit surface 146 of collimation lens 144.

Figure 10:
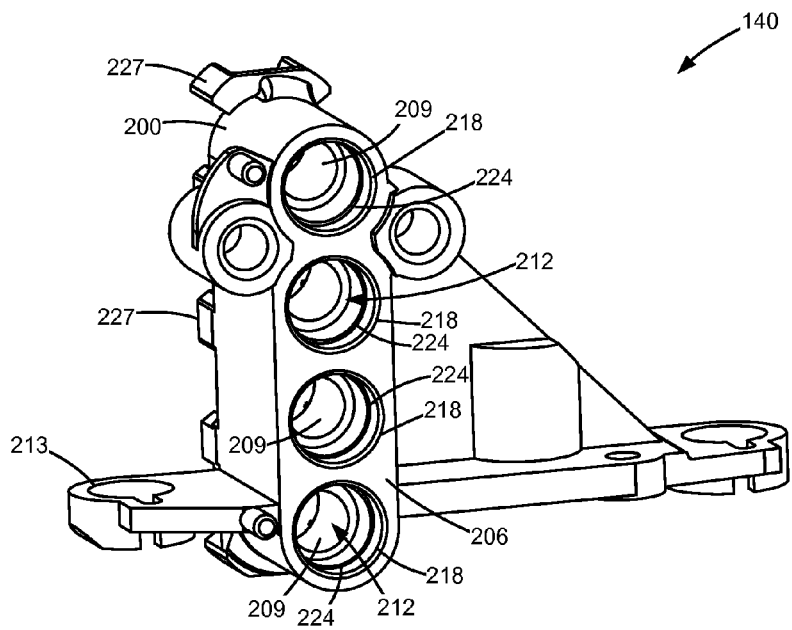
FIG. 10 is a rear perspective view of the collimation assembly in FIG. 7.
Figure 11:
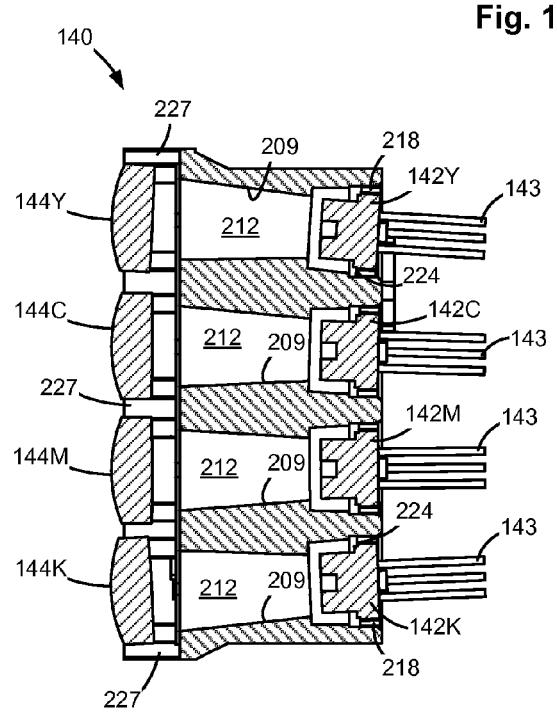
FIG. 11 is a cross-sectional view of the collimation assembly taken along lines 11-11 of FIG. 7.
Figure 12:
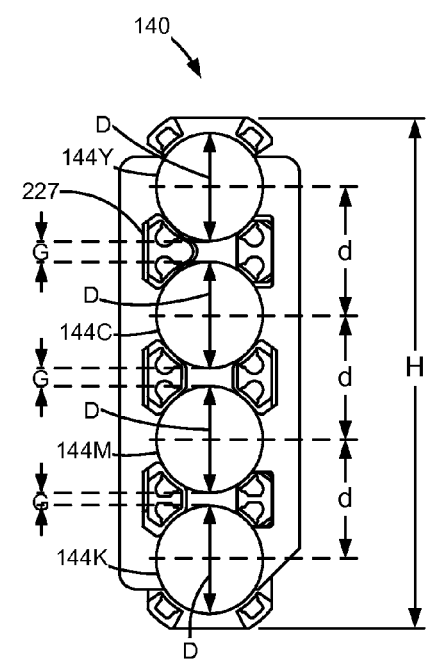
FIG. 12 is a front view of the collimation assembly of FIG. 7.

FIGS. 7-12 show collimation assembly 140 according to example embodiments of the present disclosure. Collimation assembly 140, as illustrated, includes light sources 142 and collimation lenses 144 maintained in a body 200. Body 200 has a front side 203, a rear side 206, and inner surfaces 209 defining hollow portions 212 formed through body 200 and extending between opposed front side 203 and rear side 206. Body 200 further includes openings 213 each for receiving a respective fastener (not shown) for attaching collimation assembly 140 to datum surfaces of LSU 130. In one example embodiment, body 200 may be formed as a single molded piece. Each hollow portion 212 defines a first opening 215 at the front side 203 and a second opening 218 at the rear side 206. The light sources 142 are disposed and retained in the respective second openings 218 while collimation lenses 144 are disposed at the respective first openings 215 such that each collimation lens 144 is positioned along the beam axis 221 (FIG. 9) of a respective light source 142. As seen in FIGS. 10 and 11, each of the second openings 218 at the rear side 206 of body 200 is formed with a pocket 224 sized to receive a light source 142. In one example embodiment, light sources 142 may be retained in their respective pockets 224 by an adhesive or other retaining means. Each light source 142 includes lead wires 143 which are connected to the driver circuitry for receiving pulse signals for powering the light source 142.

Collimation assembly 140 further includes a plurality of support members 227 extending from the front side 203 of body 200, and a plate member 230 disposed between the front side 203 and collimation lenses 144. Support members 227 may be integrally molded as part of body 200 or formed as separate components that are attached to the front side 203 of body 200. Support members 227 extend through plate member 230 via corresponding slots 233 formed on plate member 230 and are positioned to support collimation lenses 144 in a substantially linear or stacked arrangement. In the example shown, four support members 227 engage with the circumferential edge of a collimation lens 144 and position the collimation lens 144 along the beam axis 221 of the respective light source 142. Installing a collimation lens 144 may be accomplished, for example, by precisely aligning the collimation lens 144 along the x, y and z directions relative to the corresponding light source 142, and adhesively attaching the collimation lens 144 to four support members 227 surrounding the corresponding aperture 236 such as by using ultraviolet (UV) adhesive. It will also be appreciated that different shapes, sizes, and/or arrangements of support members 227 may be used other than those depicted in the illustrated examples.

A plurality of apertures 236 are formed along a centerline 239 of plate member 230. In the example shown, the apertures 236 are formed with a rectangular shape and are located between the collimation lenses 144 and respective first openings 215 to allow portions of the light beams LB emitted by light sources 142 to pass through the plate member 230 and be received by respective collimation lenses 144. Each aperture 236 may be sized to have a height that allows sufficient amount of optical energy to pass through for forming a latent image on photoconductive member 110 while preventing or reducing stray light from one light source 142 from being imaged into the collimation lens associated with an adjacent light source 142 to prevent optical "cross-talk" between image information signals of two adjacent light beams LB, and a width that allows laser beam LB, after passing through collimation lens 144 and prescan lenses 164A, 164B, to have a beam width that overfills at least two facets 174 of polygon mirror 172 upon arriving thereat. In one example embodiment, aperture 236 may have a height between about 0.3 mm and about 3 mm, and a width between about 2 mm and about 12 mm. In other alternative example embodiments, other shapes for apertures 236 may be used.

Figure 13:
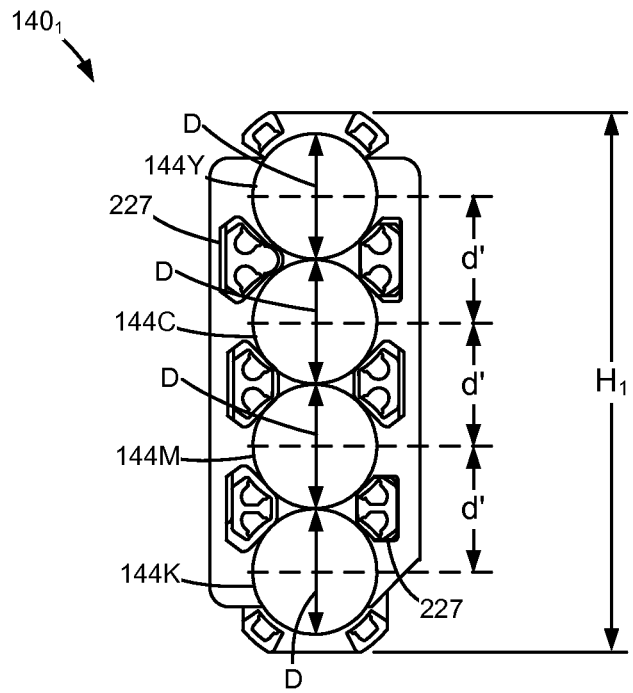
FIG. 13 illustrates a front view of a collimation assembly, according to another example embodiment.

Adjacent collimation lenses 144 may be spaced relatively close to each other so as to reduce the height H of collimation assembly 140 and allow for a relatively small space requirement within LSU 130, which consequently allows for the size of LSU 130 to be reduced. In one example embodiment, the spacing between the centers of adjacent collimation lenses 144 may at least correspond to the diameter of each collimation lens 144, such as between about 5 mm and about 12 mm. As an example, in FIG. 12, centers of adjacent collimation lenses 144 in collimation assembly 140 are spaced at a distance d that is greater than the diameter D of collimation lenses 144 such that adjacent collimation lenses 144 are arranged linearly (or centers of the collimation lenses 144 are arranged along a line) but vertically spaced from each other by a gap G. In one example embodiment, gap G may be between about 0.2 mm and about 5 mm. In another example embodiment illustrated in FIG. 13, centers of adjacent collimation lenses 144 in collimation assembly 140$_1$ are spaced at a distance d' that is substantially equal to the diameter D of collimation lenses 144 such that adjacent collimation lenses 144 are arranged so that the centers thereof are arranged along a line without spacing therebetween. In this way, height H of collimation assembly 140 may be further reduced to height H$_1$ by reducing the gap between adjacent collimation lenses 144 to approach zero or actually be zero such that the outer circumferential surface of adjacent collimation lenses 144 contact each other.

Figure 14:
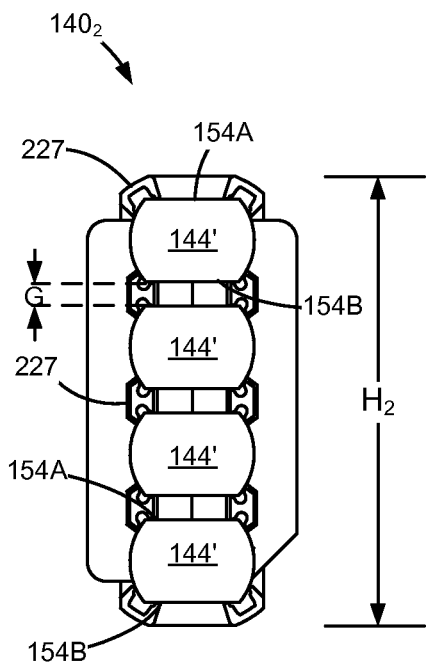
FIG. 14 illustrates a front view of a collimation assembly, according to another example embodiment.
Figure 15:
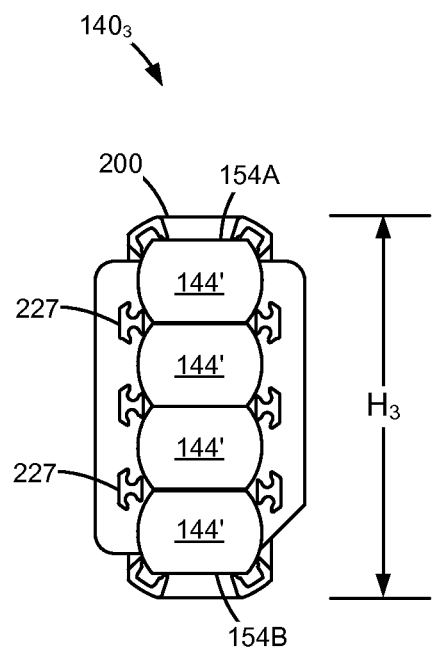
FIG. 15 illustrates a front view of a collimation assembly, according to another example embodiment.

In another example embodiment, height H of collimation assembly 140 may be further reduced by cutting out segments of each collimation lens 144. For example, in FIGS. 14-15, each collimation lens 144' is cut along chords of its circumference to remove opposed upper and lower segments thereof and form opposed edge surfaces 154A, 154B. In one example embodiment, the cut segments of collimation lens 144' may, combined, correspond to up to about 50 percent of the front surface area thereof. When collimation lenses 144' are stacked with cut-edge surfaces 154A, 154B arranged parallel to each other and extending in a direction perpendicular to the linear arrangement of collimation lenses 144', a reduced height of collimation assembly 140 may be achieved. In FIG. 14, cut-edge surfaces 154A, 154B of adjacent collimation lenses 144' are spaced from each other by a gap G resulting in collimation assembly 140$_2$ having reduced height H$_2$. In FIG. 15, adjacent collimation lenses 144' are arranged such that substantially no gap exists between adjacent cut-edge surfaces 154A, 154B resulting in collimation assembly 140$_3$ having a further reduced height H$_3$. Thus, by cutting away upper and lower segments of each collimation lens 144, the arrangement of collimation lenses 144 can be made more compact and the height of the collimation assembly can be further reduced.

With the above example embodiments, LSU 130 utilizes a compact collimation assembly 140 which incorporates all four light sources 142 and four collimation lenses 144.

Additionally, stacking and incorporating the light sources 142 and collimation lenses 144 into one collimation assembly 140 eliminates the need to employ separate prescan mirrors 30 as illustrated in FIG. 1A. Instead, a single prescan mirror 162 can be used to receive and direct all four light beams LB to scanning device 170. Further, utilizing collimation lenses 144 as effective beam expanding optical components eliminates the need to incorporate additional beam expanding optics in LSU 130. Accordingly, use of collimation assembly 140 and its compact design allows for a simplified optical design which not only provides significantly less number of optical components, which can reduce the tolerance stack up caused by accumulated variation of size and/or position of individual downstream optical components and improve robustness, but also provides significant savings with respect to the overall cost of LSU 130, and consequently the cost of imaging forming device 100.

The description of the details of the example embodiments have been described in the context of electrophotographic imaging devices. However, it will be appreciated that the teachings and concepts provided herein are applicable to other systems employing optical scanners for scanning light beams. Additionally, although the collimation assembly in the above example embodiments has been described as having four light sources and four collimation lenses at opposed openings of four hollow portions of the body, it will be understood that having more than four hollow portions of the body, more than four light sources and more than four collimation lenses may be implemented for the collimation assembly.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A collimation assembly, comprising:
    a body having inner surfaces that define at least four hollow portions extending through the body between opposed first and second sides thereof, each hollow portion having opposed first and second openings at the first and second sides of the body, respectively;
    at least four light sources, each light source disposed at the first opening of one of the at least four hollow portions and controllable to emit a light beam therethrough; and
    at least four collimation lenses, each collimation lens disposed at the second opening of one of the at least four hollow portions to receive the light beam emitted by the light source disposed at the first opening and diverge the light beam as the light beam passes through the collimation lens;
    wherein the at least four light sources are supported by the body and stacked vertically above one another as oriented during use and the at least four collimation lenses are supported by the body and stacked vertically above one another as oriented during use.

2. The collimation assembly of claim 1, further comprising a plurality of support members extending from the second side of the body, wherein the at least four collimation lenses are supported by the plurality of support members.

3. The collimation assembly of claim 2, wherein the plurality of support members are formed integral with the body.

4. The collimation assembly of claim 1, further comprising a plate member disposed upstream of the at least four collimation lenses and including at least four apertures, wherein the at least four apertures are positioned to allow at least portions of the light beams emitted by the light sources to pass through the plate member and be received by respective collimation lenses.

5. The collimation assembly of claim 1, wherein the plurality of support members are components attached to the second side of the body.

6. The collimation assembly of claim 1, wherein each of the at least four collimation lenses has a diameter between about 5 mm and about 12 mm.

7. The collimation assembly of claim 1, wherein adjacent collimation lenses of the at least four collimation lenses are spaced from each other between about 0.2 mm and about 5 mm.

8. The collimation assembly of claim 1, wherein the at least four collimation lenses are substantially linearly arranged without spacing between adjacent collimation lenses.

9. The collimation assembly of claim 1, wherein each of the at least four collimation lenses include opposed cut edge surfaces that extend in a direction perpendicular to a linear arrangement of the at least four collimation lenses.

10. A scanning system, comprising:
    a housing;
    a scanning member disposed within the housing and having a plurality of reflective surfaces; and
    a collimation assembly disposed within the housing, the collimation assembly comprising:
        a body having inner surfaces that define a first, a second, a third, and a fourth hollow portion extending through the body between opposed first and second sides thereof, each hollow portion having opposed first and second openings at the first and second sides of the body, respectively, and being vertically stacked above one another as oriented during use;
        a first light source, a second light source, a third light source, and a fourth light source positioned at the first openings of the first, second, third, and fourth hollow portions, respectively, the first, second, third, and fourth light sources controllable to emit first, second, third, and fourth light beams, respectively; and
        a first, a second, a third, and a fourth collimation lens disposed at the second openings of the first, second, third, and fourth hollow portions, respectively, the first, second, third, and fourth collimation lens for receiving, diverging, and expanding the light beams emitted by the first, second, third, and fourth light sources, respectively, so as to be incident on at least two reflective surfaces of the scanning member upon arriving thereat.

11. The scanning system of claim 10, wherein the scanning system includes no more than two prescan lenses and each light beam has an optical path that includes therealong the no more than two prescan lenses.

12. The scanning system of claim 10, further comprising at least one scan lens disposed downstream from the scanning member, wherein each light beam has an optical path that includes therealong the at least one scan lens, the at least one scan lens for focusing at least portions of the light beams deflected by the scanning member on an imaging surface.

13. The scanning system of claim 10, wherein the scanning member comprises a polygon mirror.

14. The scanning system of claim 10, wherein the collimation assembly further comprises a plurality of support members extending from the second side of the body, wherein the first, second, third, and fourth collimation lenses are supported by the plurality of support members.

15. The scanning system of claim 14, wherein the plurality of support members and the body are formed as a unitary piece.

16. The scanning system of claim 14, wherein the collimation assembly further comprises a plate member disposed between the second side of the body and the collimation lenses and including a plurality of slots and four apertures, wherein the plurality of support members extend through the plate member via corresponding slots thereof and the four apertures are positioned to allow the light beams emitted by respective light sources to pass through the plate member and be received by respective collimation lenses.

17. The scanning system of claim 10, wherein each of the first, second, third, and fourth collimation lenses has a diameter between about 5 mm and about 12 mm.

18. The scanning system of claim 10, wherein adjacent collimation lenses are spaced from each other between about 0.2 mm and about 5 mm.

19. The scanning system of claim 10, wherein the first, second, third, and fourth collimation lenses are substantially linearly arranged without spacing between adjacent collimation lenses.

20. The scanning system of claim 10, wherein each of the first, second, third, and fourth collimation lenses include opposed cut edge surfaces that extend in a direction perpendicular to a linear arrangement of the collimation lenses.

21. A collimation assembly, comprising:
- a body having inner surfaces that define at least four hollow portions extending through the body between opposed first and second sides thereof, each hollow portion having opposed first and second openings at the first and second sides of the body, respectively;
- at least four light sources, each light source disposed at the first opening of one of the at least four hollow portions and controllable to emit a light beam therethrough; and
- at least four collimation lenses, each collimation lens disposed at the second opening of one of the at least four hollow portions to receive the light beam emitted by the light source disposed at the first opening and diverge the light beam as the light beam passes through the collimation lens; and
- a plate member between the second side of the body and the at least four collimation lenses, the plate member having apertures to allow at least portions of the light beams emitted by the light sources to pass through the plate member and be received by the collimation lenses.

* * * * *